US009110588B2

United States Patent
Chen et al.

(10) Patent No.: US 9,110,588 B2
(45) Date of Patent: Aug. 18, 2015

(54) OPTICAL TOUCH DEVICE AND METHOD FOR DETECTING TOUCH POINT

(71) Applicant: Wistron Corporation, New Taipei (TW)

(72) Inventors: Shih-Wen Chen, New Taipei (TW);
Yu-Yen Chen, New Taipei (TW);
Ching-An Cho, New Taipei (TW)

(73) Assignee: Wistron Corporation, Hsichih, New Taipei (TW)

( * ) Notice: Subject to any disclaimer, the term of this patent is extended or adjusted under 35 U.S.C. 154(b) by 0 days.

(21) Appl. No.: 14/277,789

(22) Filed: May 15, 2014

(65) Prior Publication Data
US 2015/0153945 A1    Jun. 4, 2015

(30) Foreign Application Priority Data
Nov. 29, 2013  (TW) .............................. 102143859 A

(51) Int. Cl.
*G06F 3/042*       (2006.01)
*G06F 3/0488*     (2013.01)

(52) U.S. Cl.
CPC .......... *G06F 3/04883* (2013.01); *G06F 3/0421* (2013.01)

(58) Field of Classification Search
CPC ........................... G06F 3/04883; G06F 3/0421
USPC ......................................................... 345/175
See application file for complete search history.

(56) References Cited

U.S. PATENT DOCUMENTS

| | | | | |
|---|---|---|---|---|
| 2005/0200612 | A1* | 9/2005 | Tanaka et al. | 345/175 |
| 2010/0321309 | A1* | 12/2010 | Lee et al. | 345/173 |
| 2011/0116105 | A1* | 5/2011 | Zhu et al. | 356/621 |
| 2011/0261013 | A1 | 10/2011 | Lin | |

* cited by examiner

*Primary Examiner* — Jonathan Blancha
(74) *Attorney, Agent, or Firm* — Winston Hsu; Scott Margo

(57) ABSTRACT

An optical touch device utilizes two images sensed by two image sensing units, which are diagonal to each other, to determine whether a number of touch points located at a central touch area is equal to 1. When the number of touch points are larger than 1, the optical touch device further utilizes another two images sensed by another two image sensing units, which are also diagonal to each other, to assist in determining the number of touch points located at the central touch area, so as to improve the accuracy of determination.

6 Claims, 6 Drawing Sheets

OPTICAL TOUCH DEVICE AND METHOD FOR DETECTING TOUCH POINT

BACKGROUND OF THE INVENTION

1. Field of the Invention

The invention relates to an optical touch device and a method for detecting touch point and, more particularly, to an optical touch device and a method for detecting touch point capable of determining the number of touch points accurately.

2. Description of the Prior Art

Since consumer electronic products have become more and more lighter, thinner, shorter, and smaller, there is no space on these products for containing a conventional input device, such as mouse, keyboard, etc. With development of touch technology, in various kinds of consumer electronic products (e.g. display device, all-in-one device, mobile phone, personal digital assistant (PDA), etc.), a touch device has become a main tool for data input. Compared with other touch design, such as a resistive touch design, a capacitive touch design, an ultrasonic touch design, or a projective touch design, an optical touch design has lower cost and is easier to use, especially for large-size touch display.

A conventional optical touch device senses a touch point indicated by a touch object (e.g. finger or stylus) on an indication plane by two image sensing units arranged oppositely. When the image sensing units sense the touch object on the indication plane, a processing unit of the optical touch device can calculate the touch point indicated by the touch object accordingly. When the conventional optical touch device is used for sensing one single touch point performed by one single finger, the position of the touch point can be calculated by a triangulation method easily. However, once there are multiple touch points performed by two or more than two fingers, it is complicated to identify and calculate the number of touch points and this could result in mis-identification and interference.

SUMMARY OF THE INVENTION

The invention provides an optical touch device and a method for detecting touch point capable of determining the number of touch points accurately, so as to solve the aforesaid problems.

According to the claimed invention, an optical touch device comprises an indication plane having a first edge and a second edge, the first edge being opposite to the second edge; a first image sensing unit and a second image sensing unit separately disposed on the first edge; a third image sensing unit and a fourth image sensing unit separately disposed on the second edge, a central touch area being defined between the first image sensing unit, the second image sensing unit, the third image sensing unit and the fourth image sensing unit, the first image sensing unit and the third image sensing unit being diagonal to each other, the second image sensing unit and the fourth image sensing unit being diagonal to each other; and a processing unit electrically connected to the first image sensing unit, the second image sensing unit, the third image sensing unit and the fourth image sensing unit; wherein when a touch gesture is performed on the central touch area, the first image sensing unit senses a first image, the second image sensing unit senses a second image, the third image sensing unit senses a third image and the fourth image sensing unit senses a fourth image; the processing unit calculates N touch points according to the first image and the third image and determines whether N is equal to 1, N is a positive integer; when N is equal to 1, the processing unit determines that the touch gesture generates one touch point on the central touch area; when N is larger than 1, the processing unit calculates M touch points according to the second image and the fourth image and determines whether N is larger than or equal to M, M is a positive integer; when N is larger than or equal to M, the processing unit determines that the touch gesture generates M touch points on the central touch area; when N is smaller than M, the processing unit determines that the touch gesture generates N touch points on the central touch area.

According to the claimed invention, a first boundary of the central touch area connects the first image sensing unit and the fourth image sensing unit, a second boundary of the central touch area connects the second image sensing unit and the third image sensing unit, a first diagonal line of the central touch area connects the first image sensing unit and the third image sensing unit, a first angle is included between the first boundary and the first diagonal line, the first angle is included between the second boundary and the first diagonal line, the processing unit calculates p touch points within the first angle according to the first image and calculates q touch points within the first angle according to the third image, and a sum of p and q is equal to N.

According to the claimed invention, a second diagonal line of the central touch area connects the second image sensing unit and the fourth image sensing unit, a second angle is included between the first boundary and the second diagonal line, the second angle is included between the second boundary and the second diagonal line, the processing unit calculates r touch points within the second angle according to the second image and calculates s touch points within the second angle according to the fourth image, and a sum of r and s is equal to M.

According to the claimed invention, a method for detecting touch point is adapted to an optical touch device, the optical touch device comprises an indication plane, a first image sensing unit, a second image sensing unit, a third image sensing unit and a fourth image sensing unit, the indication plane has a first edge and a second edge, the first edge is opposite to the second edge, the first image sensing unit and the second image sensing unit are separately disposed on the first edge, the third image sensing unit and the fourth image sensing unit are separately disposed on the second edge, a central touch area is defined between the first image sensing unit, the second image sensing unit, the third image sensing unit and the fourth image sensing unit, the first image sensing unit and the third image sensing unit are diagonal to each other, the second image sensing unit and the fourth image sensing unit are diagonal to each other, the method comprises steps of when a touch gesture is performed on the central touch area, the first image sensing unit sensing a first image, the second image sensing unit sensing a second image, the third image sensing unit sensing a third image and the fourth image sensing unit sensing a fourth image; calculating N touch points according to the first image and the third image and determining whether N is equal to 1, wherein N is a positive integer; when N is equal to 1, determining that the touch gesture generates one touch point on the central touch area; when N is larger than 1, calculating M touch points according to the second image and the fourth image and determining whether N is larger than or equal to M, wherein M is a positive integer; when N is larger than or equal to M, determining that the touch gesture generates M touch points on the central touch area; and when N is smaller than M, determining that the touch gesture generates N touch points on the central touch area.

According to the claimed invention, a first boundary of the central touch area connects the first image sensing unit and the fourth image sensing unit, a second boundary of the central touch area connects the second image sensing unit and the third image sensing unit, a first diagonal line of the central touch area connects the first image sensing unit and the third image sensing unit, a first angle is included between the first boundary and the first diagonal line, the first angle is included between the second boundary and the first diagonal line, the method further comprises step of calculating p touch points within the first angle according to the first image and calculating q touch points within the first angle according to the third image, wherein a sum of p and q is equal to N.

According to the claimed invention, a second diagonal line of the central touch area connects the second image sensing unit and the fourth image sensing unit, a second angle is included between the first boundary and the second diagonal line, the second angle is included between the second boundary and the second diagonal line, the method further comprises step of calculating r touch points within the second angle according to the second image and calculating s touch points within the second angle according to the fourth image, wherein a sum of r and s is equal to M.

As mentioned in the above, the invention utilizes two images sensed by two image sensing units, which are diagonal to each other, to determine whether a number of touch points located at a central touch area is equal to 1. When the number of touch points are larger than 1, the optical touch device further utilizes another two images sensed by another two image sensing units, which are also diagonal to each other, to assist in determining the number of touch points located at the central touch area, so as to improve the accuracy of determination. Accordingly, the invention can determine the number of touch points accurately, so as to execute the corresponding touch function.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
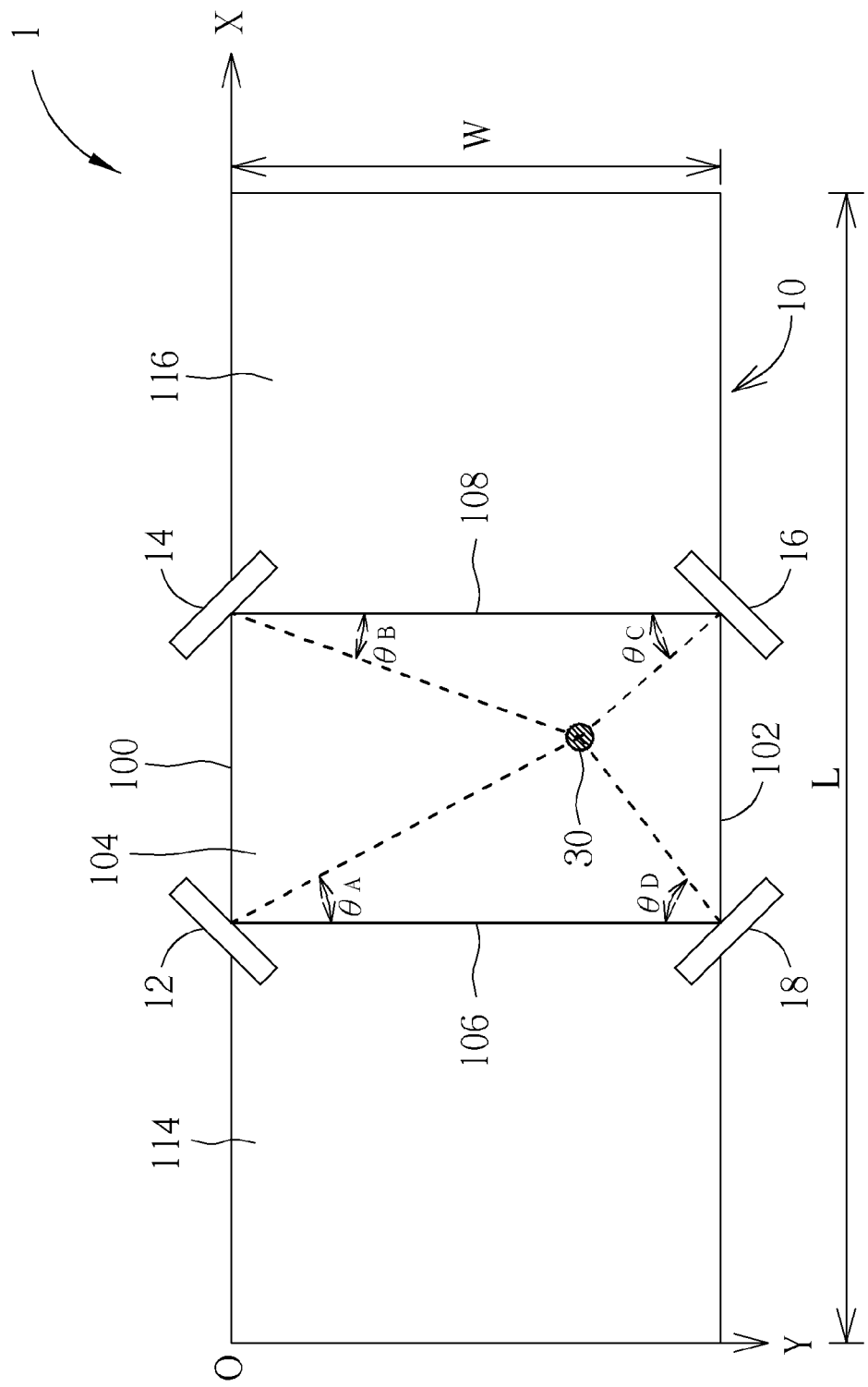
FIG. 1 is a schematic diagram illustrating an optical touch device according to an embodiment of the invention.
Figure 2:
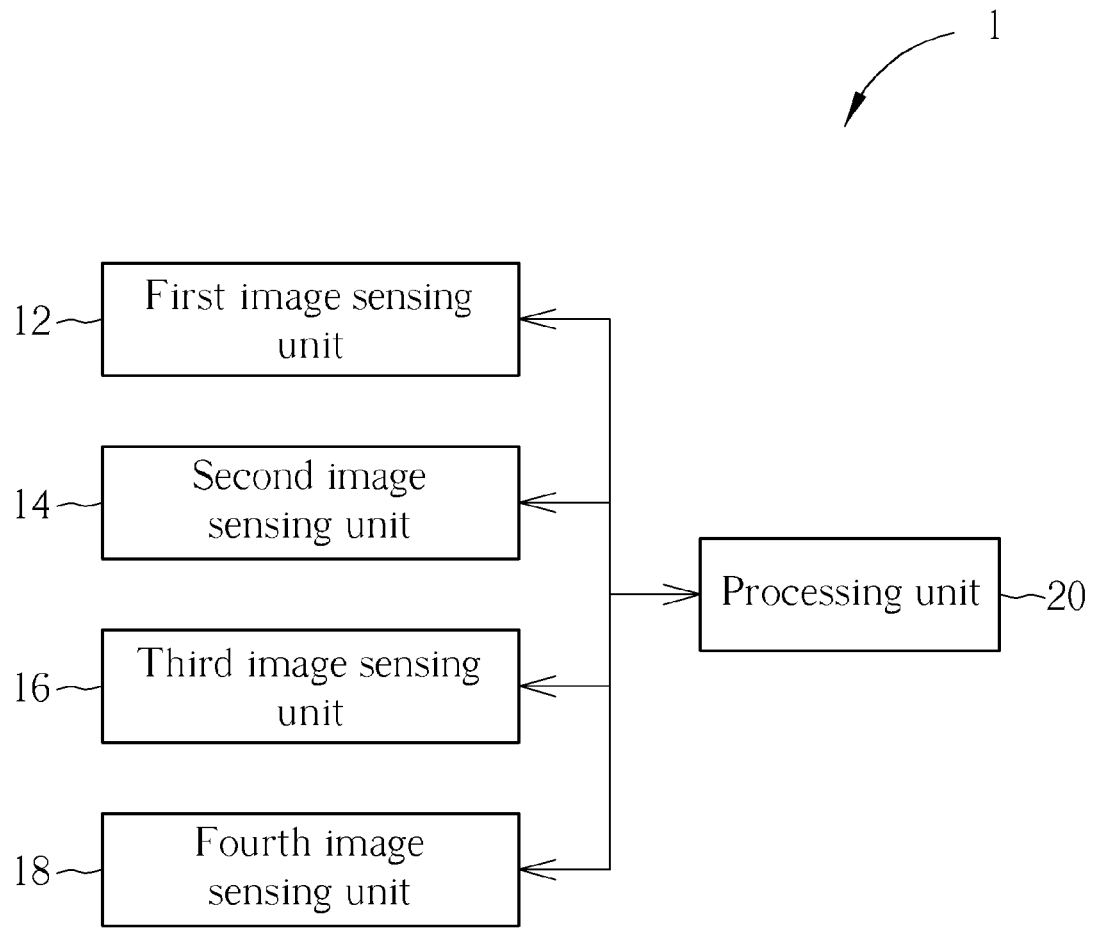
FIG. 2 is a functional block diagram illustrating the optical touch device shown in FIG. 1.

Referring to FIGS. 1 and 2, FIG. 1 is a schematic diagram illustrating an optical touch device 1 according to an embodiment of the invention, and FIG. 2 is a functional block diagram illustrating the optical touch device 1 shown in FIG. 1. As shown in FIGS. 1 and 2, the optical touch device 1 comprises an indication plane 10, a first image sensing unit 12, a second image sensing unit 14, a third image sensing unit 16, a fourth image sensing unit 18 and a processing unit 20, wherein the processing unit 20 is electrically connected to the first image sensing unit 12, the second image sensing unit 14, the third image sensing unit 16 and the fourth image sensing unit 18.

In practical applications, the indication plane 10 may be a display panel (e.g. liquid crystal display panel), a white board, a black board, a projecting screen or other planes for a user to perform touch operation; the first image sensing unit 12, the second image sensing unit 14, the third image sensing unit 16 and the fourth image sensing unit 18 may be, but not limited to, charge-coupled device (CCD) sensors or complementary metal-oxide semiconductor (CMOS) sensors; and the processing unit 20 may be a processor or a controller with data calculation/processing function. In practical applications, a plurality of light emitting units (e.g. light emitting diodes) may be disposed adjacent to the first image sensing unit 12, the second image sensing unit 14, the third image sensing unit 16 and the fourth image sensing unit 18 or a light bar may be disposed around the indication plane 10, so as to provide light for touch operation. Once the light emitting units are disposed adjacent to the first image sensing unit 12, the second image sensing unit 14, the third image sensing unit 16 and the fourth image sensing unit 18, there may be light reflecting frame or light absorbing frame disposed around the indication plane 10 based on practical applications.

The indication plane 10 has a first edge 100 and a second edge 102, wherein the first edge 100 is opposite to the second edge 102. The first image sensing unit 12 and the second image sensing unit 14 are separately disposed on the first edge 100, and the third image sensing unit 16 and the fourth image sensing unit 18 are separately disposed on the second edge 102, wherein a central touch area 104 is defined between the first image sensing unit 12, the second image sensing unit 14, the third image sensing unit 16 and the fourth image sensing unit 18, the first image sensing unit 12 and the third image sensing unit 16 are diagonal to each other, and the second image sensing unit 14 and the fourth image sensing unit 18 are diagonal to each other. Furthermore, a first boundary 106 of the central touch area 104 connects the first image sensing unit 12 and the fourth image sensing unit 18, and a second boundary 108 of the central touch area 104 connects the second image sensing unit 14 and the third image sensing unit 16.

The invention may set an X-Y rectangular coordinate system and an origin O thereof in the embodiment shown in FIG. 1, wherein L represents a length of the indication plane 10 and W represents a width of the indication plane 10. The coordinate of the first image sensing unit 12 may be represented as $(X_A, Y_A)$, the coordinate of the second image sensing unit 14 may be represented as $(X_B, Y_B)$, the coordinate of the third image sensing unit 162 may be represented as $(X_C, Y_C)$, and the coordinate of the fourth image sensing unit 18 may be represented as $(X_D, Y_D)$. As shown in FIG. 1, when a touch gesture is performed on the central touch area 104 to generate a touch point 30, the first image sensing unit 12 senses an angle $\theta_A$ related to the touch point 30, the second image sensing unit 14 senses an angle $\theta_B$ related to the touch point 30, the third image sensing unit 16 senses an angle $\theta_C$ related to the touch point 30, and the fourth image sensing unit 18 senses an angle $\theta_D$ related to the touch point 30. It should be noted that the angles $\theta_A$, $\theta_B$, $\theta_C$, $\theta_D$ can be calculated and obtained easily by one skilled in the art, so the calculation will not be depicted in detail herein. Afterward, the triangulation algorithm can be used to calculate the coordinate $(X_E, Y_E)$ of the touch point 30 by the following equation 1 according to the first image sensing unit 12 and the fourth image sensing unit 18 or, alternatively, the triangulation algorithm can be used to calculate the coordinate ($X_E, Y_E$) of the touch point 30 by the following equation 2 according to the second image sensing unit 14 and the third image sensing unit 16.

$$\begin{cases} Y_E = \dfrac{X_D - X_A + \dfrac{W}{L} Y_A \tan\theta_A + \dfrac{W}{L} Y_D \tan\theta_D}{\dfrac{W}{L}(\tan\theta_A + \tan\theta_D)} \\ X_E = \dfrac{W}{L} \times Y_E \times \tan\theta_A - \dfrac{W}{L} Y_A \tan\theta_A + X_A \end{cases} \quad \text{Equation 1}$$

$$\begin{cases} Y_E = \dfrac{X_B - X_C + \dfrac{W}{L} Y_B \tan\theta_B + \dfrac{W}{L} Y_C \tan\theta_C}{\dfrac{W}{L}(\tan\theta_B + \tan\theta_C)} \\ X_E = X_B - \dfrac{W}{L} \times Y_E \times \tan\theta_B + \dfrac{W}{L} Y_B \tan\theta_B \end{cases} \quad \text{Equation 2}$$

Figure 3:
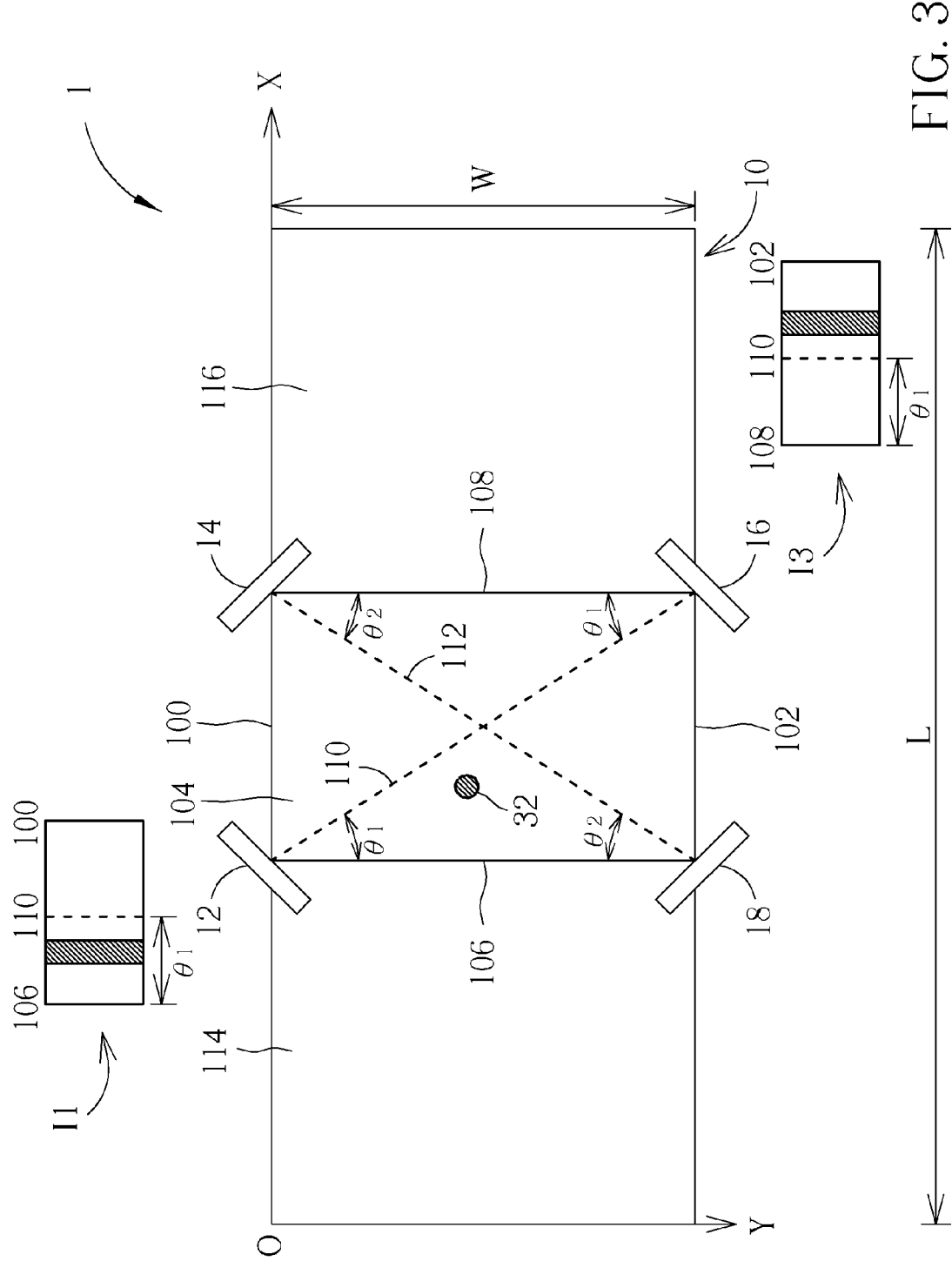
FIG. 3 is a schematic diagram illustrating one touch point generated on the central touch area.

Referring to FIG. 3, FIG. 3 is a schematic diagram illustrating one touch point 32 generated on the central touch area 104. As shown in FIG. 3, a first diagonal line 110 of the central touch area 104 connects the first image sensing unit 12 and the third image sensing unit 16, and a second diagonal line 112 of the central touch area 104 connects the second image sensing unit 14 and the fourth image sensing unit 18. After ignoring assembly and design tolerances, a first angle $\theta_1$ is included between the first boundary 106 and the first diagonal line 110, and the first angle $\theta_1$ is also included between the second boundary 108 and the first diagonal line 110. Similarly, after ignoring assembly and design tolerances, a second angle $\theta_2$ is included between the first boundary 106 and the second diagonal line 112, the second angle $\theta_2$ is also included between the second boundary 108 and the second diagonal line 112.

As shown in FIG. 3, when a touch gesture is performed on the central touch area 104 to generate one touch point 32, the first image sensing unit 12 senses a first image I1, the second image sensing unit 14 senses a second image I2, the third image sensing unit 16 senses a third image I3 and the fourth image sensing unit 18 senses a fourth image I4. Since there is only one touch point 32 generated on the central touch area 104, there is only one light shielding signal sensed in each of the first image I1, the second image I2, the third image I3 and the fourth image I4. Afterward, the processing unit 20 can calculate N touch points according to the first image I1 and the third image I3, wherein N is a positive integer. In this embodiment, the processing unit 20 can calculate p touch points within the first angle $\theta_1$ according to the first image I1, calculate q touch points within the first angle $\theta_1$ according to the third image I3, and sum up p and q, so as to obtain the aforesaid N touch points (i.e. N=p+q). For the first image sensing unit 12, the touch point 32 is located within the first angle $\theta_1$ included between the first boundary 106 and the first diagonal line 110, so the processing unit 20 calculates one touch point (i.e. p=1) within the first angle $\theta_1$ according to the first image I1. For the third image sensing unit 16, the touch point 32 is located beyond the first angle $\theta_1$ included between the second boundary 108 and the first diagonal line 110, so the processing unit 20 calculates zero touch point (i.e. q=0) within the first angle $\theta_1$ according to the third image I3. Then, the processing unit 20 obtains N=1 by p+q=N. Then, the processing unit 20 determines whether N is equal to 1. When N is equal to 1, the processing unit 20 determines that the touch gesture generates one touch point on the central touch area 104.

It should be noted that the aforesaid manner is mainly used to calculate the number of touch points within the central touch area 104. When the aforesaid manner is executed, the processing unit 20 does not calculate where the touch point is located on. In other words, the processing unit 20 cannot ensure that the touch point is located on the central touch area 104, the left touch area 114 or the right touch area 116. If there is a touch point located on the right touch area 116 and/or left touch area 114, the first image sensing unit 12 and the third image sensing unit 16 will sense the touch point beyond the first angle $\theta_1$, such that the processing unit 20 cannot ensure whether the touch point is located within the central touch area 104. Similarly, if there is a touch point located on the right touch area 116 and/or left touch area 114, the second image sensing unit 14 and the fourth image sensing unit 18 will sense the touch point beyond the second angle $\theta_2$, such that the processing unit 20 cannot ensure whether the touch point is located within the central touch area 104. Therefore, the invention detects the number of touch points by the number of touch points within the first angle $\theta_1$ sensed by the first image sensing unit 12 and the third image sensing unit 16 and/or the number of touch points within the second angle $\theta_2$ sensed by the second image sensing unit 14 and the fourth image sensing unit 18, so as to ensure that the touch point must be located within the central touch area 104.

Figure 4:
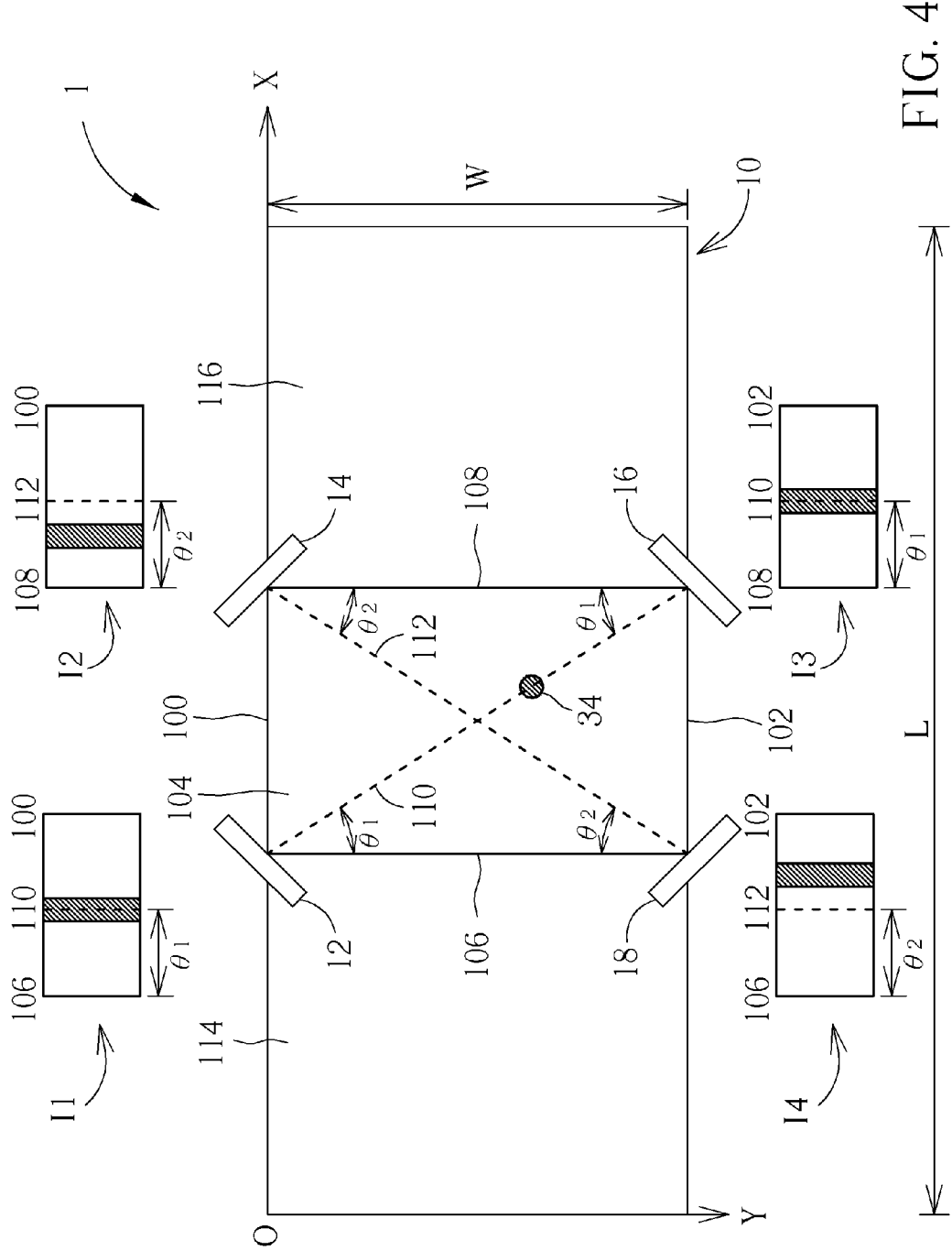
FIG. 4 is a schematic diagram illustrating one touch point located on the first diagonal line of the central touch area.

Referring to FIG. 4, FIG. 4 is a schematic diagram illustrating one touch point 34 located on the first diagonal line 110 of the central touch area 104. As shown in FIG. 4, since the touch pint 34 is generated on the first diagonal line 110 of the central touch area 104, the processing unit 20 may calculate one touch point (i.e. p=1) within the first angle $\theta_1$ according to the first image I1, calculate one touch point (i.e. q=1) within the first angle $\theta_1$ according to the third image I3, and sum up p and q, so as to obtain two touch points (i.e. N=p+q=2). However, there is only one touch point 34 generated on the first diagonal line 110 of the central touch area 104 actually. If two coordinates of two touch points are outputted, it may cause mis-operation of the optical touch device 1. Accordingly, the processing unit 20 has to determine whether N is equal to 1. When N is larger than 1, the processing unit 20 calculates M touch points according to the second image I2 and the fourth image I4, wherein M is a positive integer.

In this embodiment, the processing unit 20 can calculate r touch points within the second angle $\theta_2$ according to the second image I2, calculate s touch points within the second angle $\theta_2$ according to the fourth image I4, and sum up r and s, so as to obtain the aforesaid M touch points (i.e. M=r+s). For the second image sensing unit 14, the touch point 34 is located within the second angle $\theta_2$ included between the second boundary 108 and the second diagonal line 112, so the processing unit 20 calculates one touch point (i.e. r=1) within the second angle $\theta_2$ according to the second image I2. For the fourth image sensing unit 18, the touch point 34 is located beyond the first angle $\theta_2$ included between the first boundary 106 and the second diagonal line 112, so the processing unit 20 calculates zero touch point (i.e. s=0) within the second angle $\theta_2$ according to the fourth image I4. Then, the processing unit 20 obtains M=1 by r+s=M. Then, the processing unit 20 determines whether N is larger than or equal to M. When N is larger than or equal to M, the processing unit 20 determines that the touch gesture generates M touch points on the central touch area 104. On the other hand, when N is smaller than M, the processing unit 20 determines that the touch gesture generates N touch points on the central touch area 104.

As the embodiment shown in FIG. 4, N=2 and M=1 (i.e. N>M), so the processing unit 20 determines that the touch gesture generates one touch point on the central touch area 104, so as to avoid mis-identification.

Figure 5:
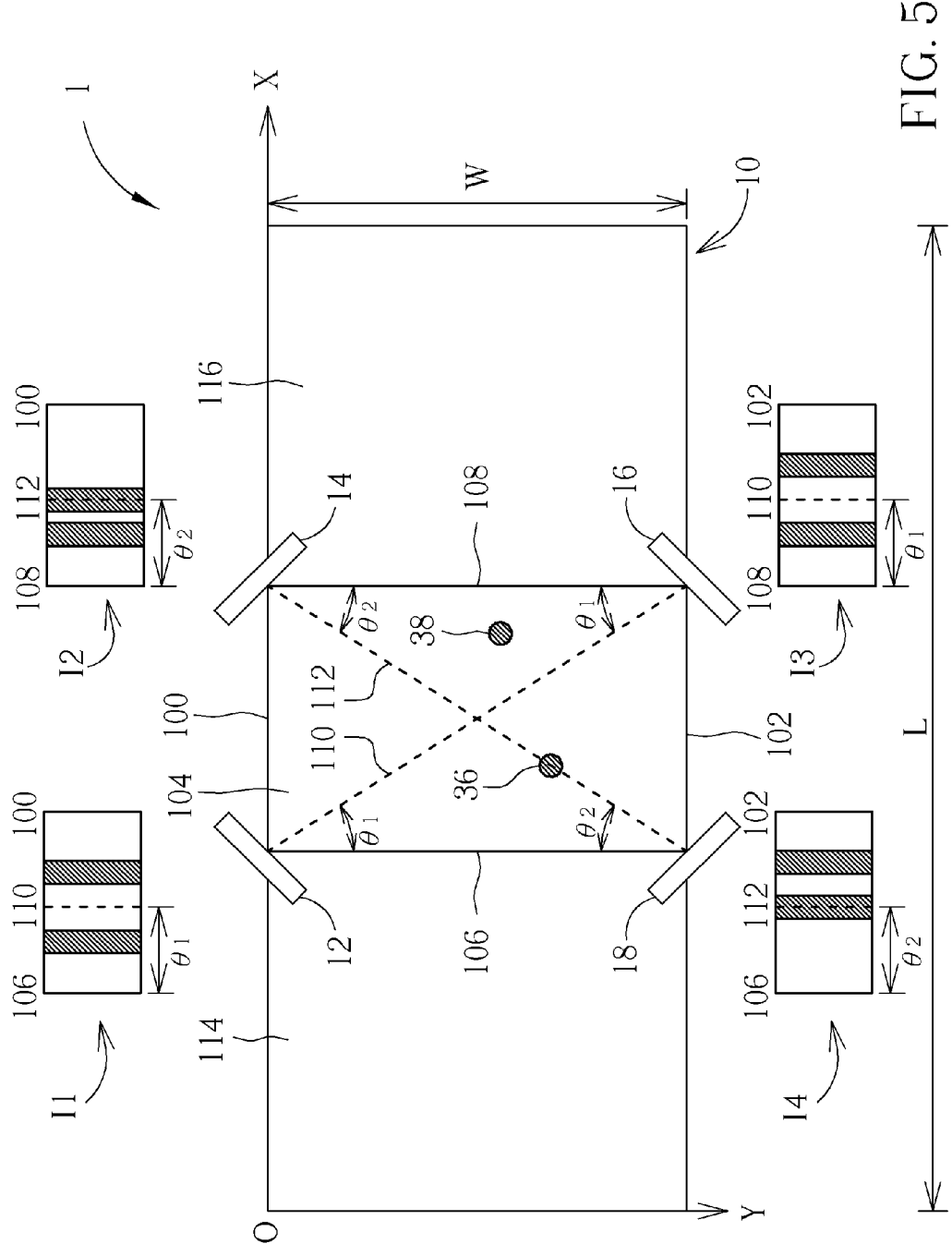
FIG. 5 is a schematic diagram illustrating two touch points generated on the central touch area, wherein the touch point is located on the second diagonal line.

Referring to FIG. 5, FIG. 5 is a schematic diagram illustrating two touch points 36, 38 generated on the central touch area 104, wherein the touch point 36 is located on the second diagonal line 112. As shown in FIG. 5, the processing unit 20 may calculate one touch point (i.e. p=1) within the first angle $\theta_1$ according to the first image I1, calculate one touch point (i.e. q=1) within the first angle $\theta_1$ according to the third image I3, and sum up p and q, so as to obtain two touch points (i.e. N=p+q=2). Since N is larger than 1, the processing unit 20 will further calculate M touch points according to the second image I2 and the fourth image I4. Since the touch point 36 is located on the second diagonal line 112 of the central touch area 104, the processing unit 20 may calculate two touch points (i.e. r=2) within the second angle $\theta_2$ according to the second image I2, calculate one touch point (i.e. s=1) within the second angle $\theta_2$ according to the fourth image I4, and sum up r and s, so as to obtain three touch points (i.e. M=r+s=3). Afterward, the processing unit 20 determines whether N is larger than or equal to M. In the embodiment shown in FIG. 5, N=2 and M=3 (i.e. N<M), so the processing unit 20 determines that the touch gesture generates two touch points on the central touch area 104, so as to avoid mis-identification.

After determining the number of touch points generated on the central touch area 104 accurately, the invention can utilizes the aforesaid equations 1 and 2 to calculate and output the coordinates of the touch points, so as to execute corresponding functions. It should be noted that the invention may utilizes the second image sensing unit 14 and the third image sensing unit 16 to calculate the number of touch points and the corresponding coordinates by a well-known optical touch principle when the touch points are generated on the left touch area 114 beside the central touch area 104; and the invention may utilizes the first image sensing unit 12 and the fourth image sensing unit 18 to calculate the number of touch points and the corresponding coordinates by a well-known optical touch principle when the touch points are generated on the right touch area 116 beside the central touch area 104.

Figure 6:
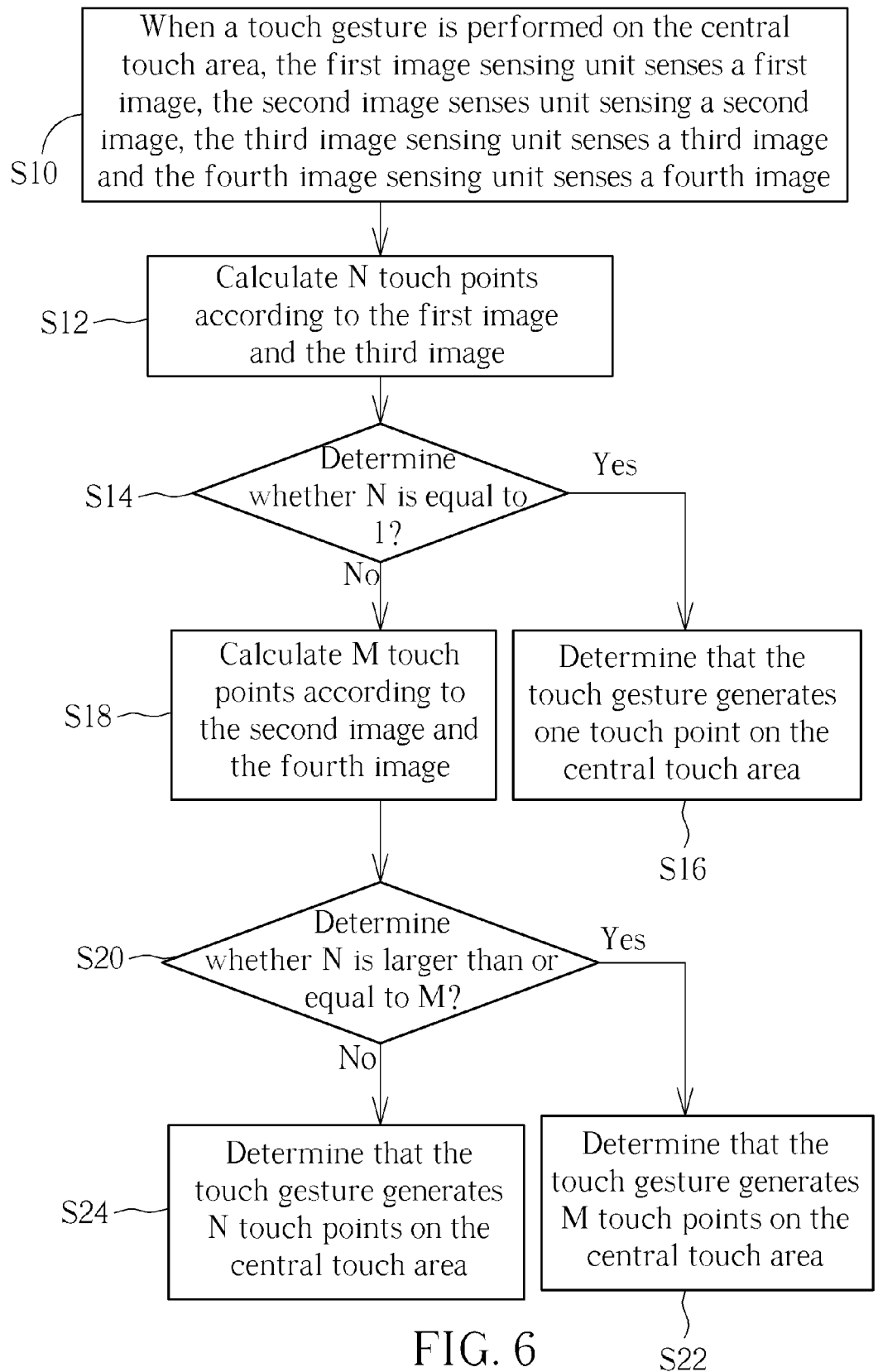
FIG. 6 is a flowchart illustrating a method for detecting touch point according to an embodiment of the invention.

Referring to FIG. 6, FIG. 6 is a flowchart illustrating a method for detecting touch point according to an embodiment of the invention. The method for detecting touch point shown in FIG. 6 is adapted to the optical touch device 1 shown in FIGS. 1 to 5. Furthermore, the control logic of the method for detecting touch point shown in FIG. 6 can be implemented by circuit and software designs. First of all, in step S10, when a touch gesture is performed on the central touch area 104, the first image sensing unit 12 senses a first image I1, the second image sensing unit 14 senses a second image I2, the third image sensing unit 16 senses a third image I3 and the fourth image sensing unit 18 senses a fourth image I4. Afterward, step S12 is performed to calculate N touch points according to the first image I1 and the third image I3. Then, step S14 is performed to determine whether N is equal to 1. When N is equal to 1, step S16 is performed to determine that the touch gesture generates one touch point on the central touch area 104. When N is larger than 1, step S18 is performed to calculate M touch points according to the second image I2 and the fourth image I4. Then, step S20 is performed to determine whether N is larger than or equal to M. When N is larger than or equal to M, step S22 is performed to determine that the touch gesture generates M touch points on the central touch area 104. When N is smaller than M, step S24 is performed to determine that the touch gesture generates N touch points on the central touch area 104. It should be noted that the other operation principles of the method for detecting touch point of the invention are mentioned in the above and those will not be depicted herein again.

As mentioned in the above, the invention utilizes two images sensed by two image sensing units, which are diagonal to each other, to determine whether a number of touch points located at a central touch area is equal to 1. When the number of touch points are larger than 1, the optical touch device further utilizes another two images sensed by another two image sensing units, which are also diagonal to each other, to assist in determining the number of touch points located at the central touch area, so as to improve the accuracy of determination. Accordingly, the invention can determine the number of touch points accurately, so as to execute the corresponding touch function.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. An optical touch device comprising:
   an indication plane having a first edge and a second edge, the first edge being opposite to the second edge;
   a first image sensing unit and a second image sensing unit separately disposed on the first edge;
   a third image sensing unit and a fourth image sensing unit separately disposed on the second edge, a central touch area being defined between the first image sensing unit, the second image sensing unit, the third image sensing unit and the fourth image sensing unit, the first image sensing unit and the third image sensing unit being diagonal to each other, the second image sensing unit and the fourth image sensing unit being diagonal to each other; and
   a processing unit electrically connected to the first image sensing unit, the second image sensing unit, the third image sensing unit and the fourth image sensing unit;
   wherein when a touch gesture is performed on the central touch area, the first image sensing unit senses a first image, the second image sensing unit senses a second image, the third image sensing unit senses a third image and the fourth image sensing unit senses a fourth image; the processing unit calculates N touch points according to the first image and the third image and determines whether N is equal to 1, N is a positive integer; when N is equal to 1, the processing unit determines that the touch gesture generates one touch point on the central touch area; when N is larger than 1, the processing unit calculates M touch points according to the second image and the fourth image and determines whether N is larger than or equal to M, M is a positive integer; when N is larger than or equal to M, the processing unit determines that the touch gesture generates M touch points on the central touch area; when N is smaller than M, the processing unit determines that the touch gesture generates N touch points on the central touch area.

2. The optical touch device of claim 1, wherein a first boundary of the central touch area connects the first image sensing unit and the fourth image sensing unit, a second boundary of the central touch area connects the second image sensing unit and the third image sensing unit, a first diagonal line of the central touch area connects the first image sensing unit and the third image sensing unit, a first angle is included between the first boundary and the first diagonal line, the first angle is included between the second boundary and the first diagonal line, the processing unit calculates p touch points within the first angle according to the first image and calculates q touch points within the first angle according to the third image, and a sum of p and q is equal to N.

3. The optical touch device of claim 2, wherein a second diagonal line of the central touch area connects the second image sensing unit and the fourth image sensing unit, a second angle is included between the first boundary and the second diagonal line, the second angle is included between the second boundary and the second diagonal line, the processing unit calculates r touch points within the second angle according to the second image and calculates s touch points within the second angle according to the fourth image, and a sum of r and s is equal to M.

4. A method for detecting touch point adapted to an optical touch device, the optical touch device comprising an indication plane, a first image sensing unit, a second image sensing unit, a third image sensing unit and a fourth image sensing unit, the indication plane having a first edge and a second edge, the first edge being opposite to the second edge, the first image sensing unit and the second image sensing unit being separately disposed on the first edge, the third image sensing unit and the fourth image sensing unit being separately disposed on the second edge, a central touch area being defined between the first image sensing unit, the second image sensing unit, the third image sensing unit and the fourth image sensing unit, the first image sensing unit and the third image sensing unit being diagonal to each other, the second image sensing unit and the fourth image sensing unit being diagonal to each other, the method comprising:

when a touch gesture is performed on the central touch area, the first image sensing unit sensing a first image, the second image sensing unit sensing a second image, the third image sensing unit sensing a third image and the fourth image sensing unit sensing a fourth image;

calculating N touch points according to the first image and the third image and determining whether N is equal to 1, wherein N is a positive integer;

when N is equal to 1, determining that the touch gesture generates one touch point on the central touch area;

when N is larger than 1, calculating M touch points according to the second image and the fourth image and determining whether N is larger than or equal to M, wherein M is a positive integer;

when N is larger than or equal to M, determining that the touch gesture generates M touch points on the central touch area; and when N is smaller than M, determining that the touch gesture generates N touch points on the central touch area.

5. The method of claim 4, wherein a first boundary of the central touch area connects the first image sensing unit and the fourth image sensing unit, a second boundary of the central touch area connects the second image sensing unit and the third image sensing unit, a first diagonal line of the central touch area connects the first image sensing unit and the third image sensing unit, a first angle is included between the first boundary and the first diagonal line, the first angle is included between the second boundary and the first diagonal line, the method further comprises:

calculating p touch points within the first angle according to the first image and calculating q touch points within the first angle according to the third image, wherein a sum of p and q is equal to N.

6. The method of claim 5, wherein a second diagonal line of the central touch area connects the second image sensing unit and the fourth image sensing unit, a second angle is included between the first boundary and the second diagonal line, the second angle is included between the second boundary and the second diagonal line, the method further comprises:

calculating r touch points within the second angle according to the second image and calculating s touch points within the second angle according to the fourth image, wherein a sum of r and s is equal to M.

* * * * *